United States Patent [19]
Thorne et al.

[11] Patent Number: 6,014,015
[45] Date of Patent: Jan. 11, 2000

[54] ELECTRICAL GENERATOR EMPLOYING ROTARY ENGINE

[75] Inventors: Anthony R. Thorne; Fredrick Kaiser, both of Bellingham, Wash.; Russell A. Skinner, Sr., Larkspur, Colo.

[73] Assignee: Alpha Technologies, Inc., Bellingham, Wash.

[21] Appl. No.: 09/130,639

[22] Filed: Aug. 6, 1998

Related U.S. Application Data

[60] Provisional application No. 60/054,924, Aug. 8, 1997.

[51] Int. Cl.[7] ............................. H02D 9/04; H02H 7/06
[52] U.S. Cl. ........................... 322/15; 322/14; 322/27; 322/33; 322/34
[58] Field of Search ................ 307/23, 64; 322/14, 322/15, 33, 34, 27; 290/40 B, 40 C, 40 R

[56] References Cited

U.S. PATENT DOCUMENTS

| | | | |
|---|---|---|---|
| 4,634,887 | 1/1987 | Balch et al. | 290/3 |
| 5,198,698 | 3/1993 | Paul et al. | 307/64 |
| 5,231,344 | 7/1993 | Marmumoto et al. | 322/14 |
| 5,481,176 | 1/1996 | DeBiasi et al. | 322/7 |
| 5,532,525 | 7/1996 | Kaiser et al. | 307/64 |
| 5,646,510 | 7/1997 | Kumar | 322/16 |

*Primary Examiner*—Nestor Ramirez
*Assistant Examiner*—Peter Medley
*Attorney, Agent, or Firm*—Michael R. Schacht; Hughes & Schacht, P.S.

[57] ABSTRACT

A system for generating electrical power signals from a fluid fuel source. The system comprises an engine and a generator. The engine burns the fuel and is connected to the generator such that the generator generates a raw power signal. An output stage generates an output power signal from the raw power signal. A control circuit controls the operation of the engine based on the output power signal. The control circuit further controls the operation of the engine based on an output current of the generator when this output current exceeds a current threshold level. The control circuit additionally controls the operation of the engine based on a temperature of the engine when the engine temperature exceeds a rated temperature level. The system thus generates sufficient power to supply a variable load but stays within an operating range defined by a rated power level and the rated temperature level.

23 Claims, 10 Drawing Sheets

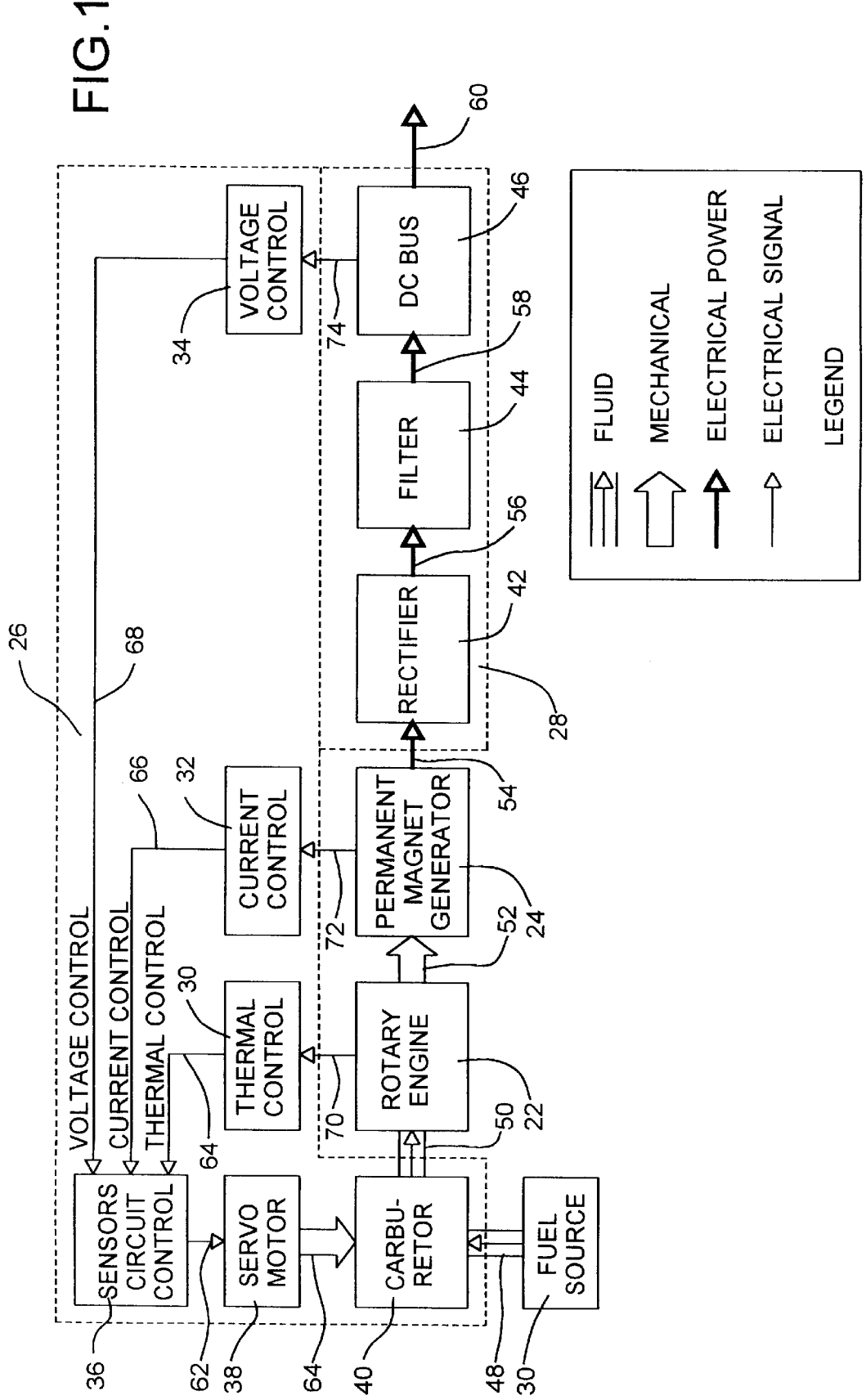

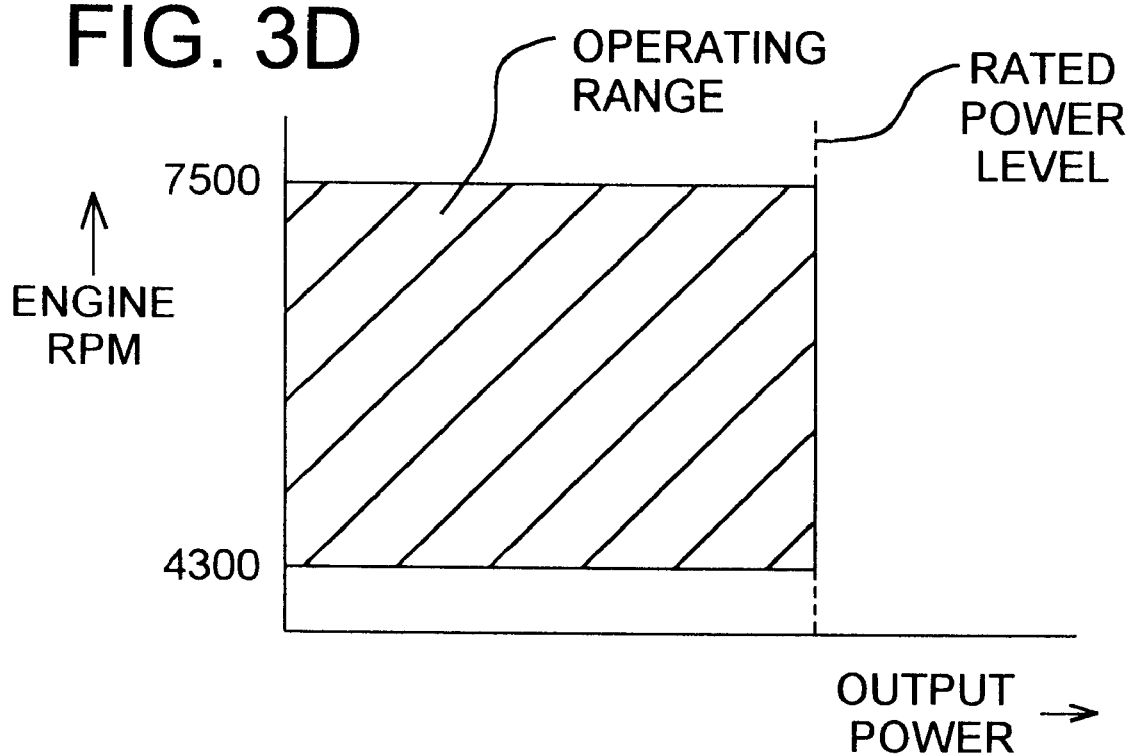

FIG. 4A THERMAL LIMITS INVERSLY PROPORTIONAL TO ENGINE RPM
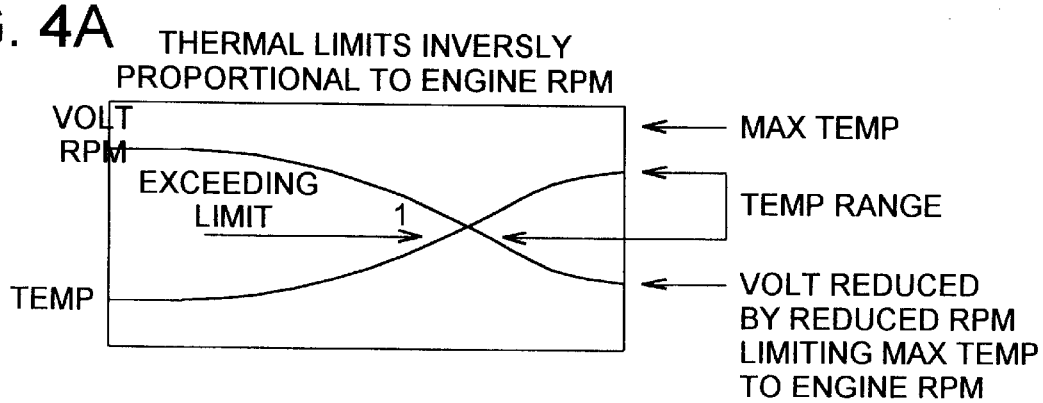
FIG. 4B
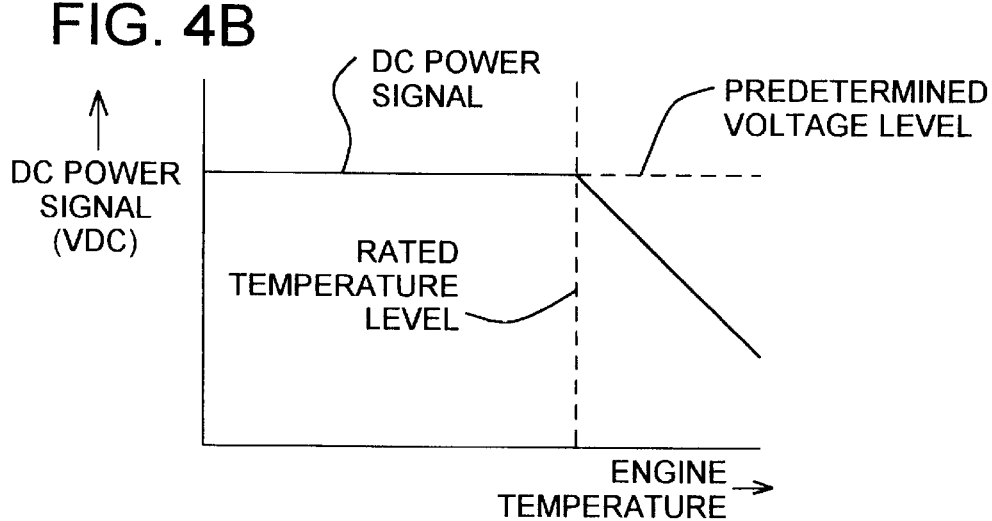
FIG. 4C
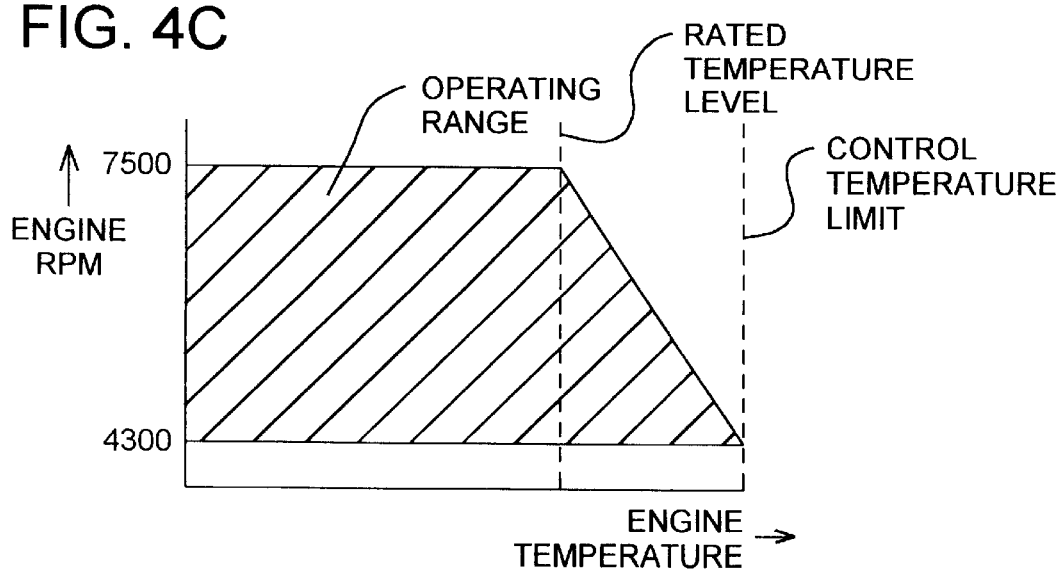

6,014,015

ELECTRICAL GENERATOR EMPLOYING ROTARY ENGINE

RELATED APPLICATIONS

This application claims priority of U.S. Provisional Patent Application Ser. No. 054,924 which was filed on Aug. 8, 1997.

FIELD OF THE INVENTION

The present invention relates to electrical generators and, more particularly, to electrical generators that employ a rotary engine as a power source.

BACKGROUND OF THE INVENTION

Many machines and devices require electrical power to operate. In many situations, utility electrical power is not available or is not desirable. For example, remote locations may not be within the area covered by the utility power grid, or a person may wish not to purchase electrical power from the utility company. In other situations, utility power may be disrupted or not be within acceptable parameters.

In situations where utility power is not available, it is common to use an electrical generator to supply electrical power, often on a temporary basis but sometimes as a main source of electrical power. A portable electrical generator may be transported to a remote location and operated to supply electrical power at the remote location. A person living "off the grid" may use an electrical generator to power electrical devices. Or if utility power is disrupted or becomes unacceptable for any reason, an electrical generator may be employed to provide electrical power until acceptable utility power service is restored.

The present invention relates to the types of electrical generators that convert mechanical energy, such as the movement of air, water, or an output shaft of an internal combustion engine, into electrical energy. More specifically, the present invention relates to electrical generators that generate electrical energy from an internal combustion engine.

Internal combustion engines typically burn a fuel such as gasoline, liquified petroleum gas, diesel oil, and/or natural gas in a controlled manner that results in the rotation of an output shaft. When used with an electrical generator, the output shaft is connected to a generator assembly that uses the rotation of the shaft to pass an electrical conductor through a magnetic field to induce an electrical signal in the conductor. The induced electrical signal is then processed into an appropriate power signal.

OBJECTS OF THE INVENTION

As should be apparent from the foregoing, one object of the present invention is to provide improved systems and methods for generating power signals.

Another more specific object of the present invention is to provide such systems and methods having a favorable mix of the following characteristics:

Operates in an energy efficient manner;

Operates with reduced noise;

Operates reliably;

Employs available components; and

Can be constructed and operated cost effectively.

SUMMARY OF THE INVENTION

The present invention is a power supply incorporating an engine having an output shaft and a generator having an input shaft and an electrical output. The engine burns a fuel to rotate the output shaft. The shafts of the engine and generator are coupled together such that operation of the engine causes the generator to generate a raw electrical signal at its electrical output. The raw electrical signal is processed to obtain an output signal.

The power supply of the present invention further comprises an engine control portion that controls the operation of the engine based on a set of monitored system parameters. The engine control portion controls the engine to ensure that the output signal is maintained within a set of desired power signal characteristics and the engine operates within a set of desired engine characteristics.

The engine control portion comprises a carburetor configured to control the flow of fuel to the engine, a servo motor operatively connected to the carburetor, a sensors control circuit that controls the servo motor, and thermal, voltage, and current control circuits connected to pass thermal, voltage, and current signals to the sensors control circuit.

The thermal, voltage, and current control circuits generate the thermal, voltage, and current signals based on the set of system monitored parameters. In particular, the thermal control circuit generates the thermal control signal based on an operating temperature of the rotary engine. The current control circuit generates the current control signal based on an output current of the generator. And the voltage control circuit generates the voltage control signal based on the output signal voltage.

Normally, the carburetor is opened and closed based on the output voltage such that the engine RPM tracks power requirements. The current control circuit takes over and throttles back the carburetor when the output current of the generator exceeds a threshold current to ensure that the output power does not exceed a rated power level. The temperature control circuit similarly takes over and throttles back on the carburetor when the temperature of the engine exceeds a rated temperature level. These various control circuits thus ensure that the generator generates the power signal as necessary within an operating range defined by output power and engine temperature.

BRIEF DESCRIPTION THE DRAWING

FIG. 1 is a block diagram depicting an electrical generator constructed in accordance with, and embodying, the principles of the present invention;

FIGS. 2A–C are graphs depicting the operation of a voltage control circuit of the generator of FIG. 1;

FIGS. 3A–D are graphs depicting the operation of a current control circuit of the generator of FIG. 1;

FIGS. 4A–C are graphs depicting the operation of a temperature control circuit of the generator of FIG. 1;

DETAILED DESCRIPTION OF THE INVENTION

Figure 2A:
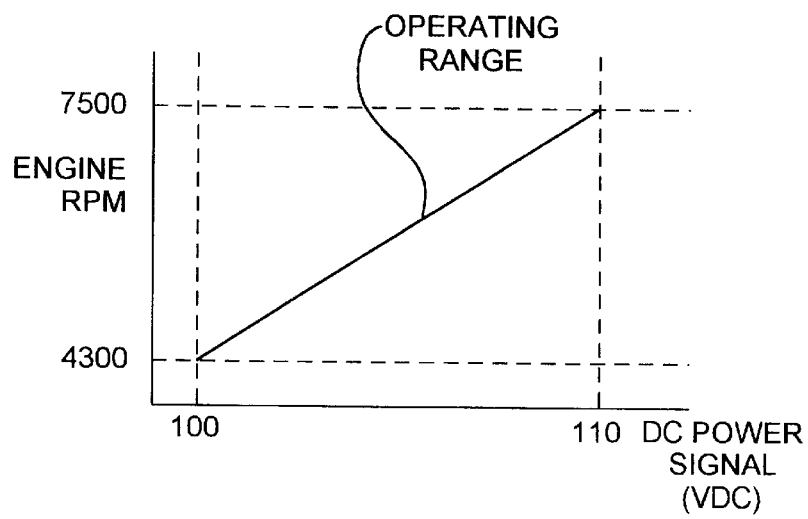

Referring initially to FIG. 1, depicted at 20 therein is an electrical generator constructed accordance with, and embodying, the principles present invention. This generator 20 comprises a engine 22, a permanent magnet generator (PMG) 24, an engine control portion 26, an electrical output stage 28, and a fuel source 30.

The exemplary engine 22 is a rotary engine of the type commonly referred to as a "Wankel" engine. A rotary engine can provide a number of benefits over conventional internal combustion engines in terms of size, weight, efficiency, vibration, noise, and the like. The present invention is thus optimized for use with a rotary engine, and that application will be described herein in detail. But the present invention may have application to other engine types as well.

The engine 22 may be a conventional rotary engine but is preferably one of several new rotary engine designs. In particular, this engine may be an engine currently available from Moller International of Davis, Calif. in limited numbers for evaluation purposes. Other acceptable rotary engines are rotary engine model numbers GAE 50R and GAE 100R currently available from Mid-West Engines Limited of Gloucestershire, UK. The PMG 24 is preferably a unit currently available on an evaluation basis as model number P3 from Libby International of Kansas City, Mo. The fuel source 30 is conventional. The engine 22, PMG 24, and fuel source 30 will be described herein only to the extent necessary for a complete understanding of the present invention.

The fuel type can vary significantly depending upon what is available. Natural gas, liquefied petroleum gas, diesel fuel, and/or gasoline may be employed as a fuel source. The exemplary rotary engines described above are of particular advantage in this respect as they can run unmodified on any of these different fuel sources; with certain fuels, the type of fuel provided can even be switched during operation.

The engine control portion 26 comprises a thermal control circuit 31, current control circuit 32, voltage control circuit 34, sensors control circuit 36, servo motor 38, and carburetor 40. The output stage 28 comprises a rectifier 42, filter 44, and DC bus 46. The servo motor 38, carburetor 40, fuel source 30, rectifier 42, filter 44, and DC bus 46 all are, or may be, conventional, and will be described herein only to the extent necessary for a complete understanding of the present invention.

Under control of the engine control circuit 26, the electrical generator 20 generates a stable DC power signal and provides protection to the rotary engine 22 that will increase the reliability and life thereof. This is accomplished by checking certain system parameters limiting or reducing the output speed of the rotary engine 22 based on the values of these parameters. To this end, the thermal control circuit 30, current control circuit 32, and voltage control circuit 34 are designed to maintain the operation of the rotary engine 22 within a certain predetermined operating range. Keeping the engine 22 within this operating range promotes reliable and long-lasting operation of the rotary engine 22 and its associated components.

The system 20 operates basically as follows. Fuel is supplied by the fuel source 30 through a conduit 48, the carburetor 40, and another conduit 50 to the rotary engine 22. The rotary engine 22 combusts this fuel in a known manner to rotate an output shaft 52 thereof. The output shaft 52 is connected to the PMG 24 such that the PMG 24 generates a raw power signal at a conductor 54. The conductor 54 is connected between the PMG 24 and the rectifier 42.

The raw power signal is rectified by the rectifier 42 to obtain a rectified power signal at a conductor 56 connected between the rectifier 42 and the filter 44.

The filter 44 filters the rectified power signal 56 to obtain a filtered power signal at a conductor 58 connected between the filter 44 and the DC bus 46. The DC bus 46 passes the filtered power signal to an output connector 60 in the form of a DC power signal.

As is well-known in the art, the rotational speed of the shaft 52 of the rotary engine 22 is related to the amount of fuel supplied to the rotary engine 22. Carburetor 40 contains a fluid valve that may be operated between a closed position and a fully opened position to meter the amount of fuel that may flow to the rotary engine 22 from the fuel source 30.

To control the opening and closing of the carburetor 40, the sensors control circuit 36 generates a servo signal on a conductor 62 connected between the sensors control circuit 36 and the servo motor 38. The servo motor 38 is connected by a mechanical linkage 64 to the carburetor 40. The servo motor 38 opens and closes the carburetor 40 based on the servo control signal generated by the sensors control circuit 36.

While any number of encoding schemes may be employed, the exemplary engine control circuit 26 employs a servo control signal that varies between a first predetermined value and a second predetermined value, with the carburetor 40 being closed when the control signal is at the first predetermined value and fully open when the control signal is at the second predetermined value. When the control signal is between these first and second predetermined values, the carburetor 40 is partially opened in a linear relation with the control signal.

The sensors control circuit 36 generates the servo control signal based on a thermal control signal generated by the thermal control circuit 31, a current control signal generated by the current control circuit 32, and a voltage control signal generated by the voltage control circuit 34. The thermal control, current control, and voltage control signals are present on conductors 64, 66, and 68 connected between the sensors control circuit 36 and the thermal control, current control, and the voltage control circuits 31–34, respectively.

The thermal control circuit 30 generates the thermal control signal based on a thermal sense signal present on a conductor 70 connected between the rotary engine 22 and the thermal control circuit 31. The thermal sense signal corresponds to the temperature of the rotary engine 22.

The current control circuit 22 generates the current control signal based on a current sense signal present on a conductor 72 connected between the PMG 24 and the current control circuit 32. The current sense signal corresponds to the output current of the permanent magnet generator.

The voltage control circuit 34 generates the voltage control signal based on a voltage sense signal present on a conductor 74 connected between the DC bus 46 and the voltage control circuit 34. The voltage sense signal corresponds to the magnitude of the DC power signal present on the DC bus 46 and at output conductor 60.

The engine control circuit 26 is designed to maintain the generator 20 within a predetermined operating range. For a majority of this operating range, the engine control circuit 26 operates in a voltage control mode. In the remaining portion of its operating range, the engine control circuit 26 operates in a thermal control mode or a current control mode.

In voltage control mode, DC power signal is maintained at a predetermined voltage level, and the RPMs of the engine 22 are varied to satisfy varying loads. When under current control, the engine control circuit 26 ensures that the output power of the generator 20 does not exceed its rated power level. Under thermal control, the engine control circuit 26 ensures that the temperature of the rotary engine 22 operates at reduced capacity above a rated temperature level and does not exceed a temperature control limit above which damage to the engine 22 may occur.

In particular, when in voltage control mode, the voltage control circuit 34 controls the RPM of the rotary engine 22 such that engine RPM is proportional to the load connected to the output conductor 60. Thus, as the load increases or decreases, the engine RPM increases and decreases at the rate necessary to maintain the DC power signal at the predetermined voltage level.

But as the output power approaches the rated power level or the temperature of the engine 22 approaches the rated temperature level, the thermal control circuit 31 and/or current control circuit 32 begin to limit engine RPM. At this point, the engine control circuit 26 begins to shift from voltage control mode to either current control or thermal control mode as necessary to maintain stable operation of the generator 20.

For example, if power drawn by the load begins to exceed the rated power level of the generator 20, the current control circuit 30 will reduce the RPM of the engine 22 such that the output power does not exceed the rated power level. If a short circuit occurs, the load will attempt to drive the output power to infinity. Without the control circuit 26, one or more components of the generator 20 will fail as the generator 20 attempts to supply infinite power. But with the engine control circuit 26, the current control circuit 32 will detect a spike in the output current of the permanent magnetic generator 24 and generate the current control signal such that engine RPM is reduced; in this extreme case, the carburetor 40 will likely be closed, essentially stopping the engine 22. The generator 20 is thus simply shut down while the short circuit condition in the load exists and can be restarted when this condition is removed. While fuses and the like may be employed to protect the generator 20 from an external short circuit, these would have to be replaced or reset before the generator 20 may be restarted.

In the case where the temperature of the engine 22 exceeds its rated temperature level, the thermal control circuit 31 will simply throttle back on the carburetor 40 to stabilize engine temperature at a level below that which will result in a shut-off of the engine. Thus, if, for example, coolant to the rotary engine 22 is lost, the temperature of the engine 22 will begin to increase. As this temperature begins to exceed the rated temperature level, the thermal control circuit will throttle back on the carburetor and reduce the output RPM of the rotary engine 22. The thermal control circuit 31 will stabilize the temperature of the engine 22 at a level where the generator 20 still functions but at an output power lower than its rated power level.

The operation of the engine control circuit 26 is shown graphically in FIGS. 2A–C, 3A–D, and 4A–C.

Figure 2B:
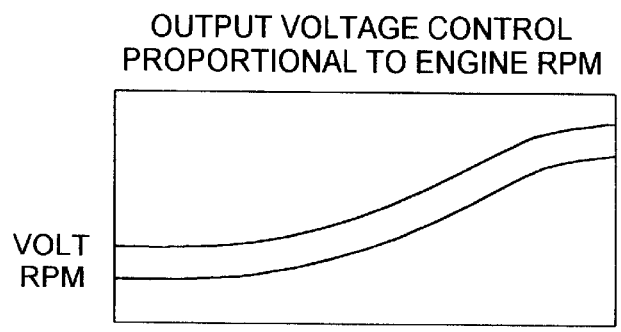

FIG. 2A depicts the linear relationship between engine RPM and the magnitude of the DC power signal for one exemplary engine 22, PMG 24, and output stage 28. In this case, the engine 22 operates between 4300 and 7500 RPM and the DC power signal is linearly related to engine RPM between 100 and 110 volts DC. This linear relationship is also shown in FIG. 2B.

Figure 2C:
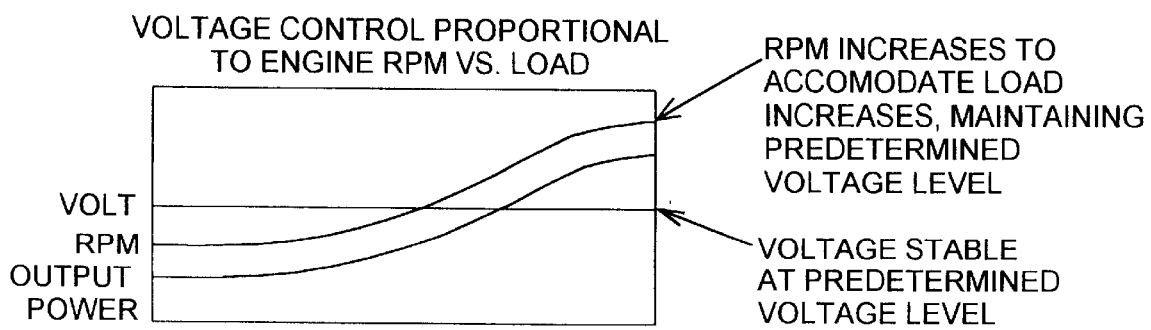

FIG. 2C depicts the situation in which the voltage control loop implemented by the voltage control circuit 34 is connected to the engine 22, PMG 24, and output stage 28. As shown in FIG. 2C, the voltage is stable at the predetermined voltage level, but the RPM of the engine is controlled by the voltage control circuit 34 to follow the power requirements of the load.

Figure 3A:
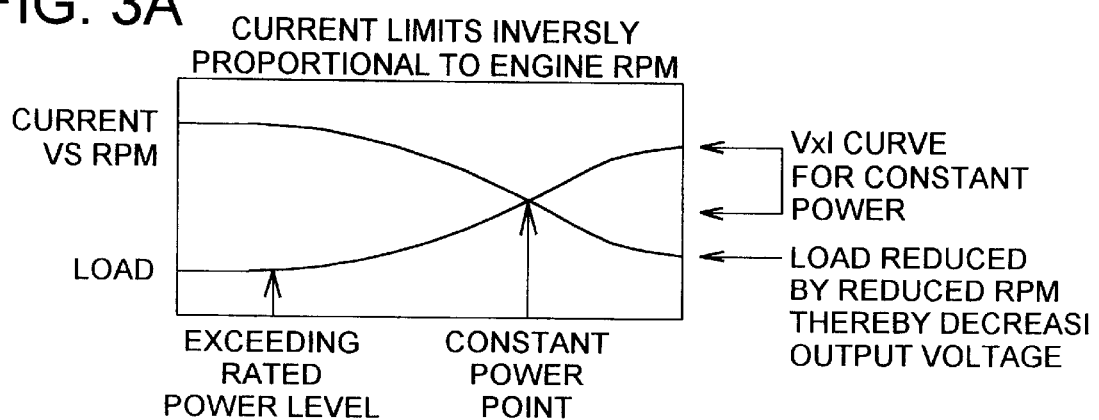
Figure 3B:
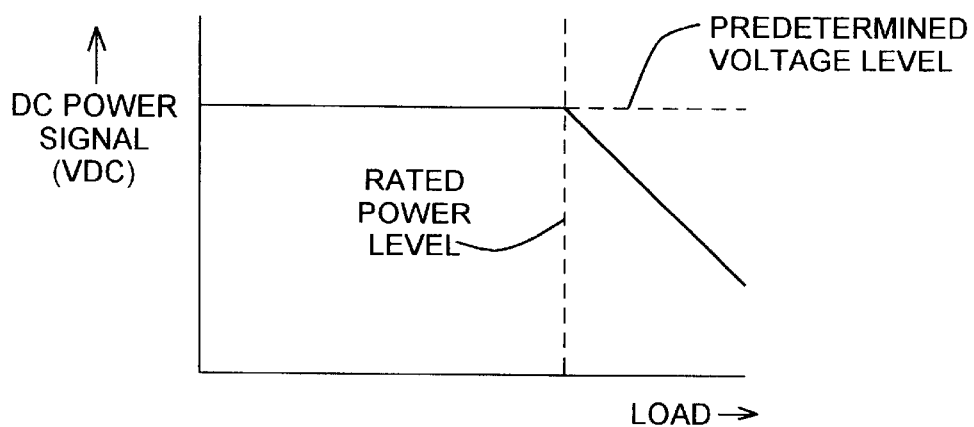

Referring now to FIG. 3A, that figure shows that, as the load exceeds the rated power level, the current control circuit 32 begins to reduce engine RPM to maintain constant power with increasing load. This is also shown in FIG. 3B, in which it can be seen that the DC power signal remains constant at a predetermined voltage level until the load exceeds the rated power level, at which point the DC power signal begins to reduce with increasing load.

Figure 3C:
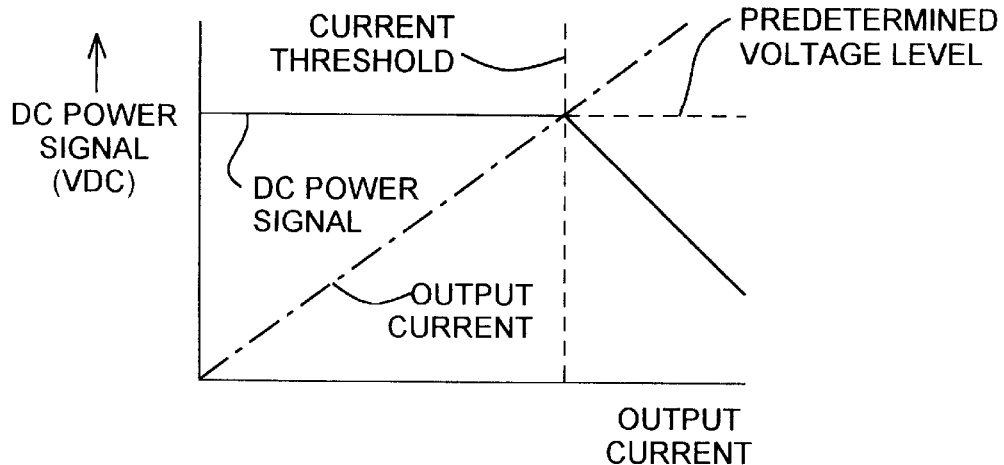

FIG. 3C depicts a V/I curve in which the DC power signal is depicted by a solid line and the output current is depicted by a dash-dot line. As the output current exceeds a predetermined current threshold (which, at the predetermined power level, corresponds to the rated power level), the DC power signal begins to drop with increasing output current to maintain constant power.

FIG. 3D depicts this relationship in terms of the operating range of the engine RPM versus output power. In FIG. 3D it can be seen that the current control circuit 32 allows the generator 20 to operate between its engine RPM limits within an operating range as necessary to supply sufficient power to the load. But the current control circuit 32 limits the output power to the rated power level, thereby defining the operating range of the generator 20.

Referring now to FIG. 4A, depicted therein is a graph indicating that, as the engine temperature begins to exceed the rated temperature level, the thermal control circuit 31 reduces engine RPM and thus the level of the DC power signal to regulate engine temperature. This is also shown in FIG. 4B where a solid line indicates the DC power signal. Below the rated temperature level, the DC power signal is constant at the predetermined voltage level. Above the rated temperature level, the DC power signal decreases with increasing engine temperature.

FIG. 4C depicts the function of the thermal control circuit 31 in the context of an operating range of the engine 22. Below the rated temperature level, the engine RPM can vary freely between 4300 and 7500 RPMs. Above the rated temperature level, the engine RPM is limited to ensure that the engine temperature is below a control temperature limit. If a problem occurs and the engine temperature starts to rise, the engine temperature will eventually stabilize at the control temperature limit. The designer sets the control temperature limit to ensure that the engine 22 can continue to operate (but at a reduced power level); at the control temperature limit, the engine block can dissipate the excess heat without catastrophic failure until the engine 22 may be serviced.

Figure 6A:
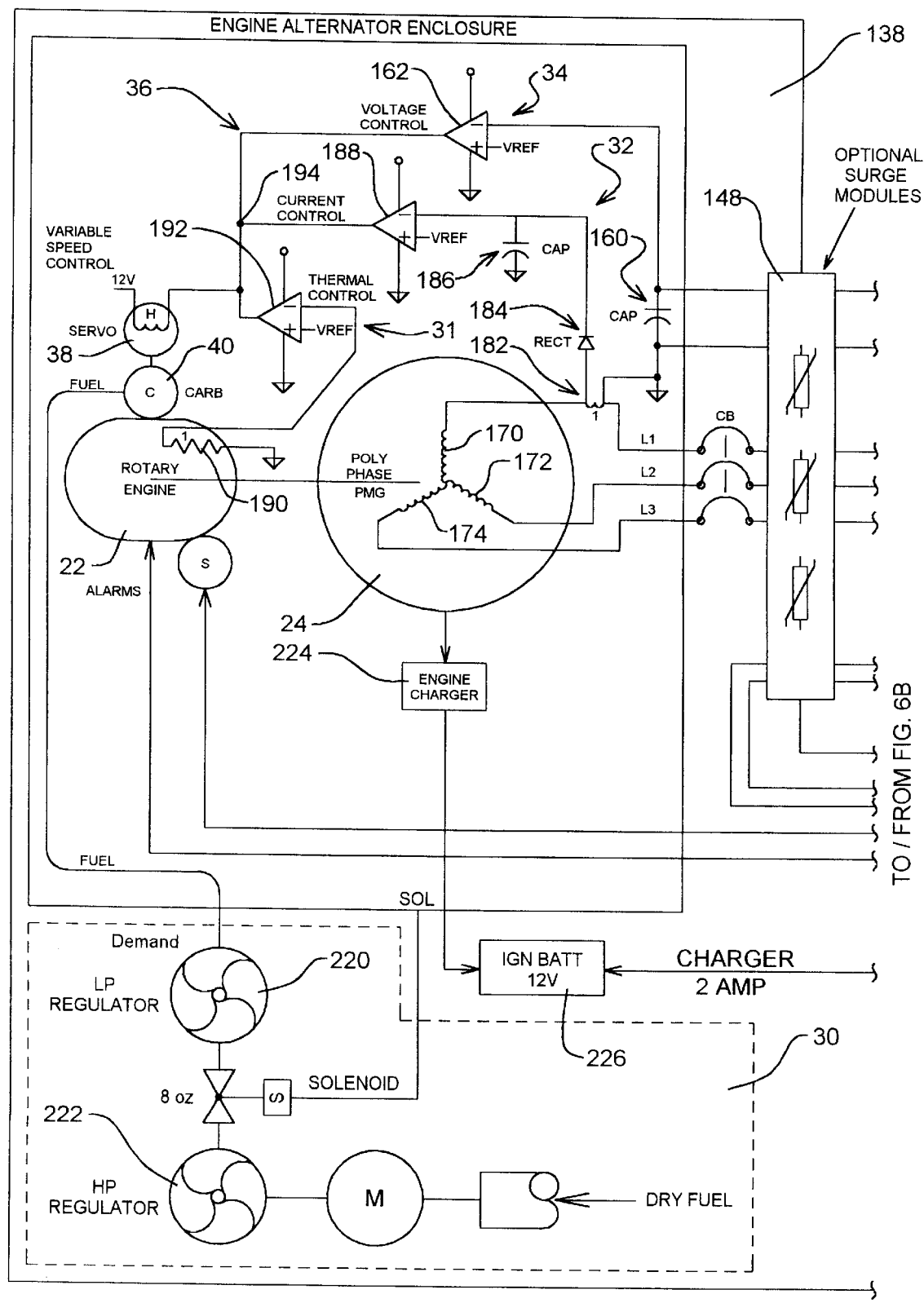
FIG. 6 is a partial schematic partial block diagram depicting the uninterruptible power supply system of FIG. 5 in further detail.
Figure 6B:
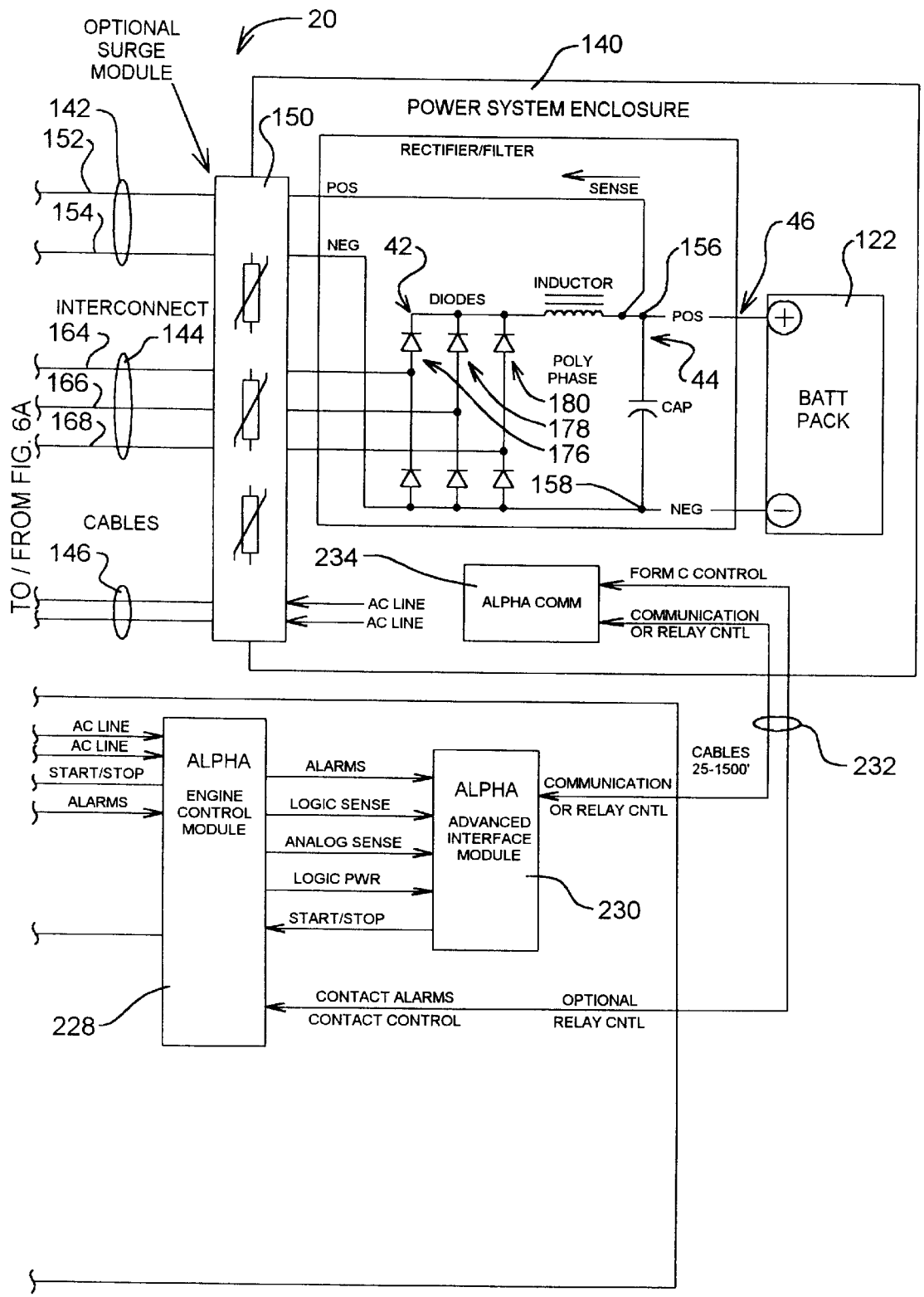
Figure 7A:
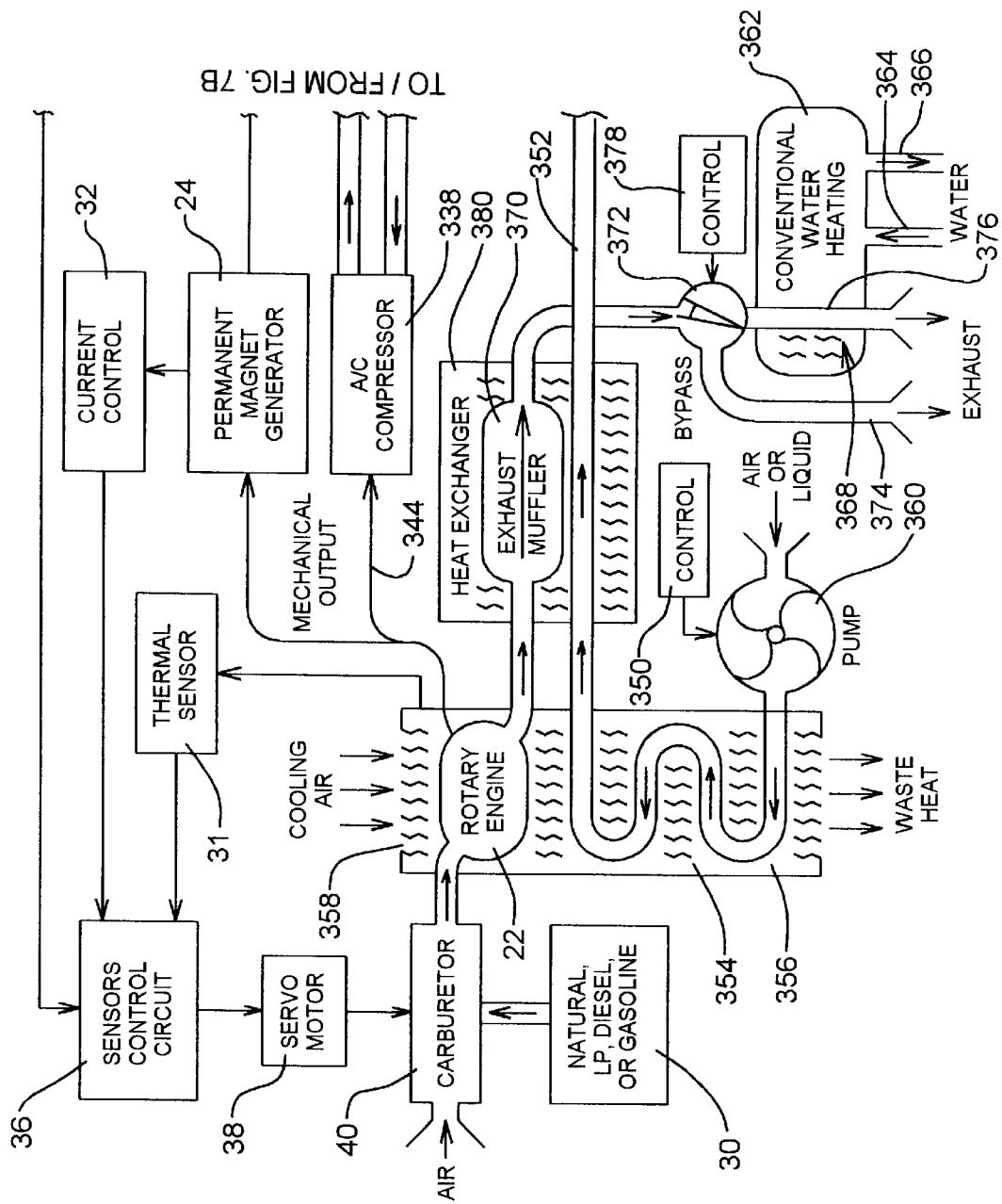
FIG. 7 is a schematic block diagram depicting the electrical generator of FIG. 1 used in the context of a cogeneration power system.
Figure 7B:
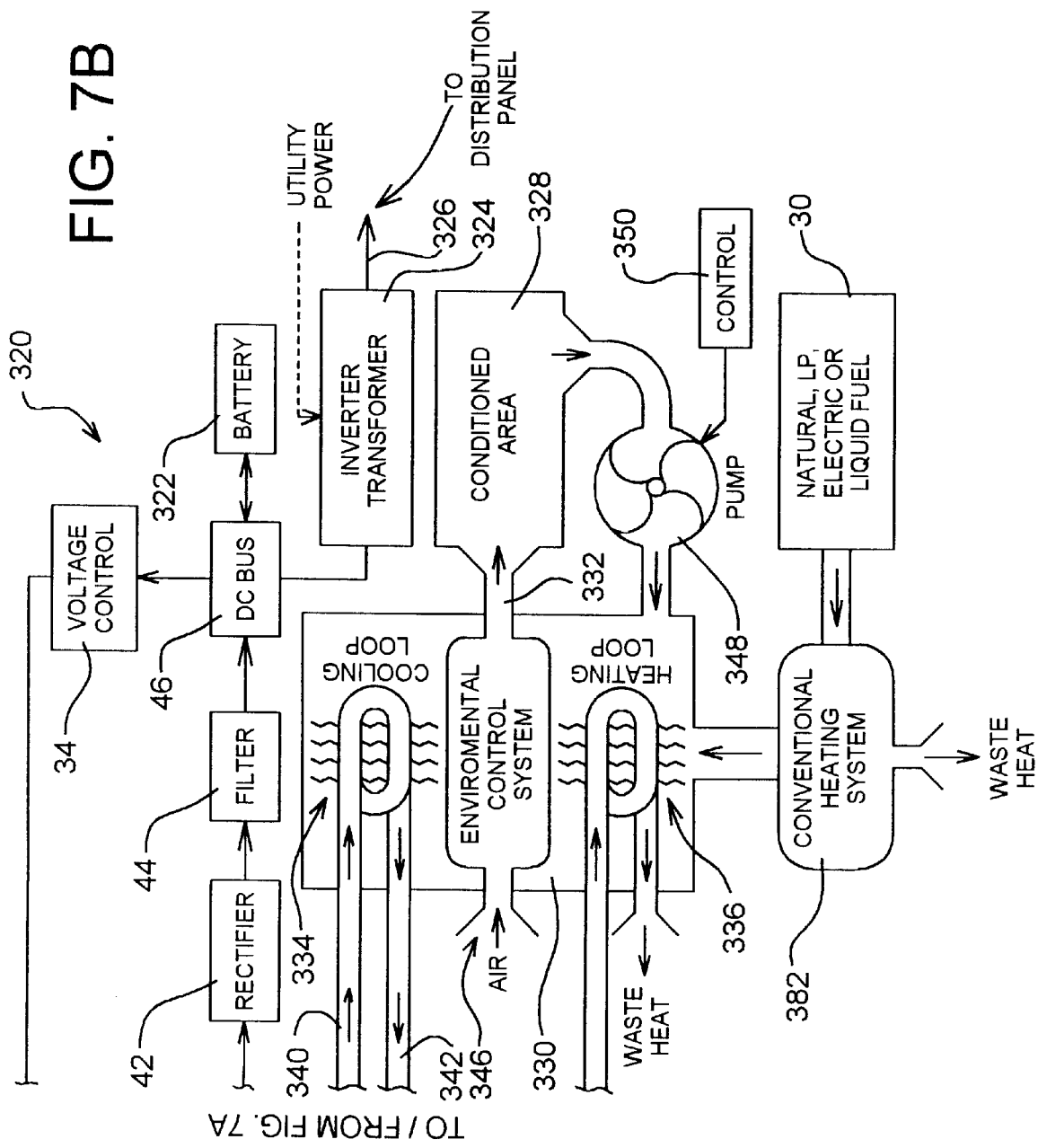

The generator 20 described above may be used in a number of environments. A first environment in which the generator 20 may be used is shown in FIGS. 5 and 6, and a second is shown in FIG. 7.

Figure 5:
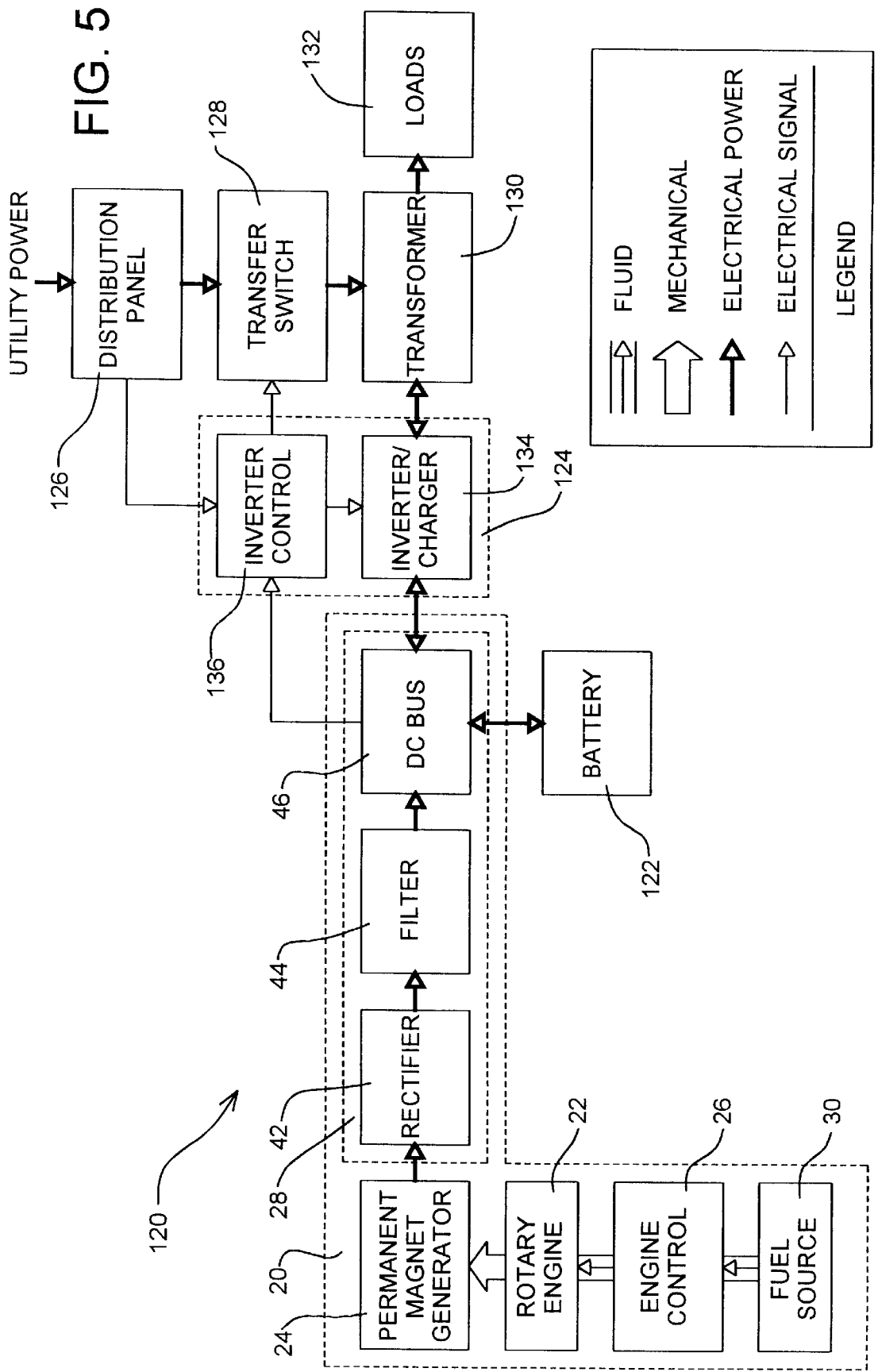
FIG. 5 is a simple block diagram depicting the generator of FIG. 1 used in the context of an uninterruptible power supply.

Referring initially to FIG. 5, the generator 20 is shown therein in the context of an uninterruptible power supply system 120. In addition to the components of the generator 20, the power supply system 120 comprises a battery 122, inverter module 124, distribution panel 126, transfer switch 128, transformer 130, and is connected to a load 132. The inverter module 124 comprises an inverter 134 and inverter control circuit 136.

Normally, utility power is supplied through the distribution panel 126 and the closed transfer switch 128 to the transformer 130. The transformer 130 is in turn connected to the loads 132. At the same time, power is supplied through the inverter charger 134 and the DC bus 46 to charge the battery 122.

Should the utility power signal be disrupted or fall outside certain parameters, the inverter control circuit 136 will detect this and open the transfer switch 128 and control the inverter charger circuit 134 to generate a standby power signal. The inverter charger circuit 134 is connected to the transformer 130 such that the standby power signal is transmitted to the loads 132. More specifically, the inverter charger circuit 134 generates the standby power signal based on the DC voltage maintained on the DC bus 46 by the battery 122.

If the disruption of utility power is more than temporary, the rotary engine 22 will be started and begin generating a DC power signal at the DC bus 46 as described above. The DC power signal generated by the generator 20 will thus supply power to the loads 132 through the inverter charger circuit 134 and transformer 130 and will also recharge the battery 122.

Once utility power has been reliably reestablished, the rotary engine 22 is turned off and power to the loads 132 is provided by the utility power.

FIG. 6 depicts in slightly more detail how the generator 20 may be packaged for use in the system 20. In this case, the engine control circuit 26, rotary engine 22, and PMG 24 are all contained in an engine enclosure 138. The electrical output stage 28 is contained in an electrical system in a power system enclosure 140. The engine enclosure 138 and power system enclosure 140 are connected by engine control cables 142, generator power cables 144, and system control cables 146.

Connector assemblies 148 and 150 are mounted on the engine enclosure 138 and power system enclosure 140, respectively. These connectors 148 and 150 are adapted to allow the cables 142, 144, and 146 to be connected as shown in FIG. 6 and may also be provided with optional surge modules.

The engine control cables 142 connect the DC bus 46 to the voltage control circuit 34. In particular, the engine control cables 142 comprise first and second voltage sense conductors 152 and 154 that form the conductor 74 described above. These conductors 152 and 154 are connected to the positive and negative terminals 156 and 158 of the DC bus 46, respectively. They are also connected across a sampling capacitor 160. The voltage across the sampling capacitor 160 corresponds to the voltage across the positive and negative terminals 156 and 158 of the DC bus 46 and is input to an operational amplifier 162 configured to generate the voltage control signal described above.

The generator power cables 144 comprise first, second, and third power cables 164, 166, and 168 that connect the first, second, and third windings 170, 172, and 174 to diode pairs 176, 178, and 180, respectively. These diode pairs 176, 178, and 180 form the rectifier 42.

A coil 182 is connected to the first winding 170 of the PMG 24. A current is induced in the coil 122 that corresponds to the current through the winding 170. This current passes through a current control diode 184 and charges a current sampling capacitor 186 such that the voltage across the capacitor 186 corresponds to the magnitude of the current flowing through the winding 170. A current control operational amplifier 188 is connected across the current sampling capacitor 186 to generate the current control signal described above.

Mounted on the rotary engine is a temperature sensor 190. This temperature sensor 190 generates the temperature sense signal, which is input to an operational amplifier 192 that generates the thermal control signal as described above.

In this case, the sensors control circuit 36 simply comprises a summing node 194 at which the voltage control, current control, and thermal control signals are summed. This node 194 is in turn connected to the servo motor 38.

FIG. 6 also shows that the fuel source 30 comprises regulators 220 and 222 configured to regulate the flow of fuel to the carburetor 40.

To start the engine 22, an engine charger 224 and ignition battery 226 are provided. The ignition battery is connected to the PMG 24 such that it can, effectively, reverse the operation of the PMG to use the PMG as a starter motor for starting the engine 22. The engine charger 224 maintains a charge on the ignition battery 226.

Also mounted within the engine enclosure 138 is an engine control module 228. This control module 228 is connected to the utility power line through the cables 146 and allows the engine to be started and stopped as necessary.

The engine alternator enclosure 138 further comprises an interface module 230 connected by cables 232 to a communications module 234. The communication module 234 is connected to a larger communication network to allow the status of the system 120 to be remotely monitored. The connection of the communication module 234 to the interface module 230 allows the status of the generator 20 to be monitored remotely.

Referring now to FIG. 7, depicted therein is a cogeneration power system 320 constructed to use the generator 20 described above. This system 320 is designed to provide power, environmental heating and cooling, and hot water to a serviced facility on either a standby basis or as a sole source of power.

To provide electrical power, the DC bus 46 is connected to a battery 322 and to an inverter transformer module 324 that is, optionally, connected to a utility power source. The inverter transformer module 324 generates an AC power signal at its output 326; this output 326 is connected to a distribution panel for conventional distribution of AC power throughout the serviced facility. Optionally, utility power may be applied to the inverter transformer module 324 so that the generator 20 may operate on a standby basis or whenever a cost analysis indicates that generating electricity using the generator 20 is less expensive than obtaining electricity from utility power.

FIG. 7 also shows that the generator 20 is additionally used to provide heat and cooling of a conditioned area 328 defined at the serviced facility. In this context, the conditioned area 328 will usually be a home or office setting in which power requirements of the home and office setting are also provided, at least on a standby basis, by the generator 20 through the distribution panel.

The system 320 comprises an environmental control subsystem 330 connected by a duct 332 to the conditioned area 328. This subsystem 330 comprises a cooling loop 334 and a heating loop 336.

Referring initially to the cooling loop 334, this is connected to an air conditioner compressor 338 by a supply duct 340 and a return duct 342. The compressor 338 is in turn mechanically connected by a second output shaft 344 of the rotary engine 22 such that the rotary engine 22 directly turns the compressor 338. The compressor 338 operates in a conventional manner to circulate a coolant material through the ducts 340 and 342. Air entering the subsystem 330 at an inlet 346 will be cooled by coolant flowing through the cooling loop. In this respect, the cooling loop 334 is a conventional heat exchanger that removes heat from air entering the inlet 346. Air is circulated through the subsystem 330 by a pump 348 that causes cooled air in the subsystem 330 to flow through the conditioned area 328. A control 350 is provided to control the amount of cool air supplied to the conditioned area 328.

The heating loop 336 is connected by a supply duct 352 to a heat exchanger 354. The heat exchanger 354 is mounted in an enclosure 356 that also contains the rotary engine 22. Cooling air passes through an inlet 358 of the enclosure 356 and is drawn over the heat exchanger 354. As the cooling air passes over the engine 22, heat is transferred from the engine 22 to the air passing thereover and thus heated air passes over the heat exchanger 354. This heat is transferred by the heat exchanger 354 to a heating fluid flowing through the supply pipe 352. This heating fluid may be air or liquid such as water and is forced through the supply pipe 352 by a pump 360. The pump operates under the control of the control panel 350.

The heating fluid flowing through the supply pipe 352 is passed through the heating loop 336 where it is exposed to air circulated by the pump 348 through the environmental control subsystem 330 and conditioned area 328. Energy carried by the heating fluid in the form of heat is transferred to the circulating air by the heating loop 336 to warm the conditioned area 328.

The system 320 additionally uses heat generated by the rotary engine 22 to heat water used in the serviced facility. In this case, a conventional water heating system 362 is supplied having a water inlet 364 and a water outlet 366. Water flowing through this conventional heating system 362 can be first passed by a heat exchanger schematically shown at 368 over the exhaust gases generated by the rotary engine 22. These exhaust gases leaving the engine 22 are passed through a muffler 370 and a bypass valve 372. The bypass valve 372 allows water to bypass the water heating system 362 through a bypass pipe 374 or pass through the water heating system 362 through a heat exchanger pipe 376. A control panel 378 is provided for operating the bypass valve 372.

Water heated by the conventional water heating system 362 may thus be preheated to a variable degree by the exhaust gases flowing through the exchanger pipe 376, thereby utilizing the heat of the exhaust system that would otherwise be wasted and minimizing, or perhaps even eliminating, the energy required by the conventional water heating system 362.

Additionally, the muffler 370 itself may be placed into a heat exchanger 380 through which the supply duct 352 passes. A portion of the heat in the engine exhaust may thus be transferred to the heating fluid passing through the duct 352. The heating fluid thus may be heated first by the heat exchanger 354 and next by the heat exchanger 380.

A conventional heating system 382 may also be supplied. This conventional heating system 382 may burn the same fuel provided by the fuel source 330 as is used by the rotary engine 22. The conventional heating system 382 will be used only in extreme circumstances or when the generator 20 is being repaired.

One manner in which the system 320 described above may be used is as follows. Normally, the rotary engine 22 may be used to power the air conditioner compressor 338, with exhaust heat being used to preheat water in the conventional water heating system 362. In this scenario, electrical power may be supplied as normal from the utility. If the utility fails, however, the PMG 24 may be connected to the rotary engine 22 such that a standby power signal is generated by the generator 20.

In other situations, the rotary engine 22 may be used to supply all of the electrical power, heating, cooling, and hot water needs of the facility in which the system 320 is mounted on a normal basis. The conventional water heating, environmental heating, and air conditioning systems may be provided and used only when the generator 20 is being serviced.

In yet another situation, the conventional water and environmental heating systems may be left out entirely, with the entire facility being powered by the rotary engine 22. In this case, no backup is provided for times when the generator system 20 is being serviced.

As briefly mentioned above, the various subsystems may be coordinated by a master control system that determines on a continual basis which of many sources of power may be employed based on the cost of these power sources at a particular point in time.

From the foregoing, it should be clear that the present invention can be implemented in a number of different environments with good results. Certain modifications may be in order to adapt the present invention to a particular environment. The scope of the present invention should thus include the invention as used in environments other than those disclosed herein.

We claim:

1. A system for generating a power signal at an output bus from a fuel source comprising:
   an engine having an output shaft, where the engine is connected to the fuel source such that the engine burns fuel to rotate the output shaft;
   a generator having generator output terminals and an input shaft operatively connected to the output shaft such that rotation of the output shaft causes the generator to generate a raw power signal at the generator output terminals;
   an output stage operatively connected between the generator output terminals and the output bus, where the output stage generates an output power signal from the raw power signal; and
   an engine control portion for generating an engine control signal for controlling the engine, where the engine control portion generates the engine control signal to operate the engine
   in a voltage control mode based on the output power signal in the absence of at least one predetermined fault state, and
   in a fault control mode in a predetermined relationship to a fault parameter associated with the predetermined fault state when the predetermined fault state exists.

2. A system as recited in claim 1, in which the engine control portion controls the engine to maintain an output power of the system within a predetermined operating range.

3. A system as recited in claim 1, in which the engine control portion comprises:
   a voltage control circuit for generating a voltage control signal corresponding to a voltage of the output power signal;
   a current control circuit for generating a current control signal corresponding to the output current of the generator;
   a temperature control circuit for generating a temperature control signal corresponding to the temperature of the engine;
   a sensors control circuit for generating the engine control signal based on the voltage control signal, the current control signal, and the temperature control signal; and engine control means for controlling the engine based on the engine control signal.

4. A system as recited in claim 3, in which the engine control means comprises:
   a carburetor operatively connected between the fuel source and the engine for controlling the amount of fuel flowing to the engine; and
   a servo motor operatively connected to the carburetor to open and close the carburetor based on the engine control signal.

5. A system as recited in claim 1, in which the engine is a rotary engine.

6. A system as recited in claim 1, in which the generator is a permanent magnet generator.

7. A system as recited in claim 1, in which the output stage comprises a rectifier and a filter.

8. A system as recited in claim 1, in which the engine control portion generates the engine control signal in at least one fault control mode selected from a group of fault control modes comprising a temperature control mode and a current control mode.

9. A system as recited in claim 8, in which
   when the engine control portion operates in the temperature control mode, the engine control portion controls engine RPM in inverse relationship to the temperature of the engine; and
   when the engine control portion operates in the current control mode, the engine control portion controls engine RPM in inverse relationship to the output current of the generator.

10. A system as recited in claim 1, in which the predetermined fault state exists when the predetermined fault parameter does not fall within a predetermined fault range associated with the predetermined fault parameter.

11. A system as recited in claim 1, in which the predetermined fault state is selected from a group of predetermined fault states comprising a temperature fault state in which the temperature of the engine does not fall within a rated temperature range and a current fault state in which the output current of the generator does not fall within a rated current range.

12. A system as recited in claim 11, in which:
   the temperature of the engine does not fall within the rated temperature range when the temperature of the engine exceeds a rated temperature level; and
   the output current of the generator does not fall within the rated current range when the output current of the generator exceeds a current threshold level.

13. A method of generating a power signal at an output bus from a fuel source comprising:
   providing an engine having an output shaft;
   providing a generator having an input shaft and generator output terminals;
   providing an output stage for conditioning electrical signals;
   operatively connecting the engine to the fuel source;
   operatively connecting the engine output shaft to the generator input shaft;
   operatively connecting the output stage between the generator output terminals and the output bus;
   operating the engine to burn fuel such that rotation of the output shaft causes the generator to generate a raw power signal at the generator output terminals;
   passing the raw power signal through the output stage to obtain an output power signal at the output bus;
   controlling the engine based on an engine control signal, where the engine control signal is generated to operate the engine
   in a predetermined relationship to the output power signal in the absence of a predetermined fault state; and
   in a predetermined relationship to a fault parameter associated with the predetermined fault state when the predetermined fault state exists.

14. A method as recited in claim 13, further comprising the step of controlling the engine to maintain an output power of the system within a predetermined operating range.

15. A method as recited in claim 13, in which the step of controlling the engine comprises the steps of:
   generating a voltage control signal corresponding to a voltage of the output power signal;
   generating a current control signal corresponding to the output current of the generator;
   generating a temperature control signal corresponding to the temperature of the engine;
   generating the engine control signal based on the voltage control signal, the current control signal, and the temperature control signal; and
   controlling the engine based on the engine control signal.

16. A method as recited in claim 15, in which the step of controlling the engine comprises the steps of:
   connecting a carburetor between the fuel source and the engine;
   connecting a servo motor to the carburetor; and
   operating the servo motor based on the engine control signal to open and close the carburetor and thereby regulate the amount of fluid flowing to the engine.

17. A method as recited in claim 13, in which the step of providing the engine comprises the step of providing a rotary engine.

18. A system as recited in claim 13, in which the step of providing the generator comprises the step of providing a permanent magnet generator.

19. A system as recited in claim 13, in which the step of providing the output stage comprises the steps of providing a rectifier and a filter.

20. A method as recited in claim 13, in which the predetermined fault state exists when the predetermined fault parameter does not fall within a predetermined fault range associated with the predetermined fault parameter.

21. A method as recited in claim 13, in which the predetermined fault state is selected from a group of predetermined fault states comprising a temperature fault state in which the temperature of the engine does not fall within a rated temperature range and a current fault state in which the output current of the generator does not fall within a rated current range.

22. A method as recited in claim 21, in which:
   the temperature of the engine does not fall within the rated temperature range when the temperature of the engine exceeds a rated temperature level; and
   the output current of the generator does not fall within the rated current range when the output current of the generator exceeds a current threshold level.

23. A method as recited in claim 13, in which the predetermined fault state is selected from a group of predetermined fault states comprising a temperature fault state and a current fault state, where:
   when the temperature fault state exists, the engine control portion controls engine RPM in inverse relationship to the temperature of the engine; and
   when the current fault state exists, the engine control portion controls engine RPM in inverse relationship to the output current of the generator.

* * * * *